United States Patent [19]

Isaacs

[11] Patent Number: 4,549,776
[45] Date of Patent: Oct. 29, 1985

[54] CONNECTING MEMBER FOR CONNECTING TWO COMMUNICATIONS TERMINAL UNITS

[75] Inventor: Robert B. Isaacs, Ottawa, Canada

[73] Assignee: Northern Telecom Limited, Montreal, Canada

[21] Appl. No.: 600,948

[22] Filed: Apr. 16, 1984

[51] Int. Cl.⁴ ............................................. H04M 1/02
[52] U.S. Cl. .................................... 312/111; 312/107; 403/405.1
[58] Field of Search ............................... 312/107, 111; 179/100 R, 100 C, 100 D, 179; 211/11; 403/405, 407

[56] References Cited

U.S. PATENT DOCUMENTS 3,421,801  1/1969  Carpenter et al. ................. 312/111
3,916,103  10/1975 Morrell et al. .................. 179/100 D
4,385,212  5/1983  Tyler ............................ 179/100 D

FOREIGN PATENT DOCUMENTS 2499382  8/1982  France ............................. 312/107

Primary Examiner—William E. Lyddane
Assistant Examiner—Joseph Falk
Attorney, Agent, or Firm—Sidney T. Jelly

[57] ABSTRACT

Communications terminals, such as telephone sets and additional terminals for particular services, are connected together by a connecting member which is attached to each terminal. Conveniently a recess is formed in each side wall of a terminal, the recesses being contiguous when two terminals are positioned side-by-side. A connecting member is positioned in the contiguous recesses, with hook-shaped members extending up through apertures in a top wall of the recesses and extending over, and preferably in close contact with the top wall. The connecting member is attached by pushing the hook-shaped members through the apertures and then sliding it relative to the terminals. The recesses can be wedge-shaped, the connecting member having a similar shape to fit in the recesses.

4 Claims, 8 Drawing Figures

CONNECTING MEMBER FOR CONNECTING TWO COMMUNICATIONS TERMINAL UNITS

This invention relates to a connecting member for connecting two communication terminal units side-by-side into a single assembly.

It is quite common to have two, or more, units relating to a communications system, positioned side by side. For example, there can be the basic telephone set with key pad and handset, plus a "hands free" unit which permits use of the telephone set without lifting the handset, plus a repertory dialer which provides automatic dialing by actuating a single key for example, plus other units. All of the units, or various selections of the units may be provided, and the particular selection may be changed occasionally.

The present invention is particularly related to connecting units which have bases which are recessed on each side at the lower edge. The connecting member attaches to both units and is positioned in the recess, enabling the units to butt. In a particular example, the recesses are wedge-shaped viewed from the side, and the connecting member is also wedge-shaped to fit in the wedge shaped recesses.

In its broadest context the connecting member comprises an elongate body member having two rows of hook-shaped members on a top surface, the rows extending in the longitudinal direction and spaced apart on the top surface. The hook-shaped members are inserted through slots in a downward facing wall of the units to be connected, and then longitudinal movement of the connecting member relative to a unit engages the hook-shaped members over the downward facing wall. A row of hook-shaped members is engaged in each unit, which are then held together.

The invention will be readily understood by the following description, by way of example, in conjunction with the accompanying drawings, in which.

Figure 1:
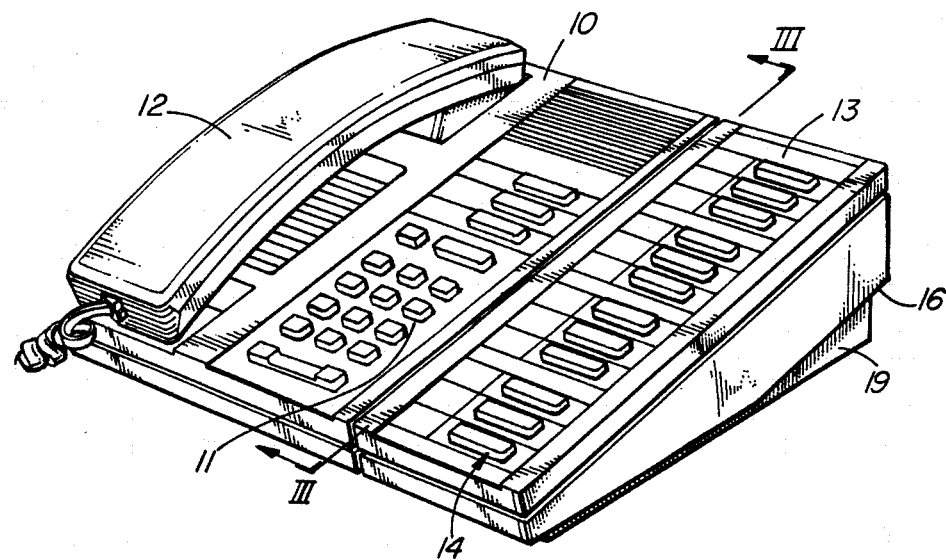
FIG. 1 is a perspective view of two communications units side-by-side.
Figure 2:
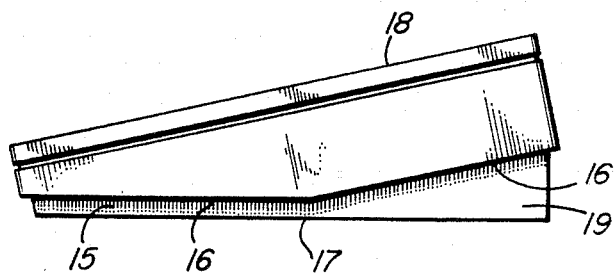
FIG. 2 is a side view of a unit as in FIG. 1.

Considering FIGS. 1 and 2, there is illustrated a fairly general telephone set 10, having a key pad at 11, a handset 12, and some other features. Positioned alongside the telephone set 10 is a further unit 13, in the example having a vertical row of pushbuttons 14. The telephone set 10 and the further unit 13 have a generally wedge shaped profile viewed from the side, as seen in FIG. 2. The lower part of each of the units is recessed, as indicated at 15. The recess forms an overhanging upper surface or wall 16 which is parallel to the lower surface 17 of the units at the forward part of the unit. Towards the rear, the overhanging upper surface or wall is inclined upward, parallel to the top surface 18 of the units. This forms a wedge-shaped recess 19 at the rear on each side of a unit. When two units are positioned side-by-side, the recesses 19 are contiguous.

Figure 3:
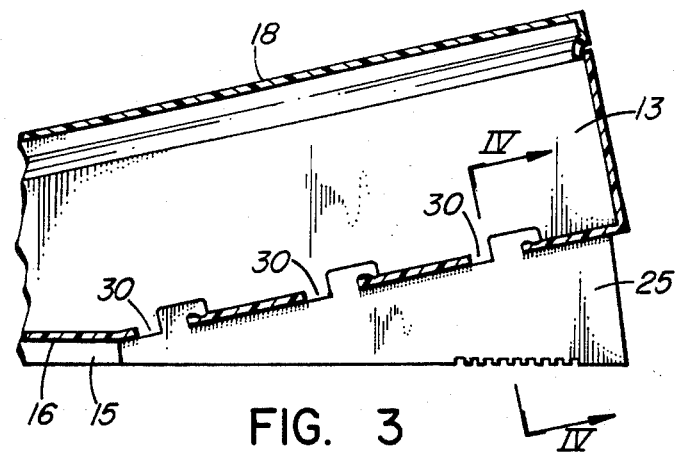
FIG. 3 is a cross-section as on the line III—III of FIG. 1.
Figure 4:
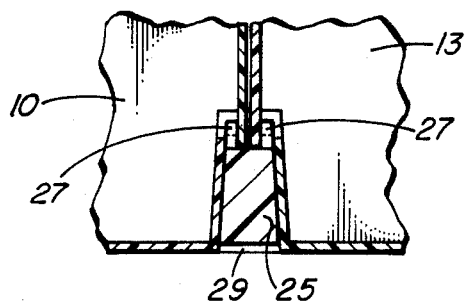
FIG. 4 is a cross-section, as on the line IV—IV of FIG. 3.
Figure 5:
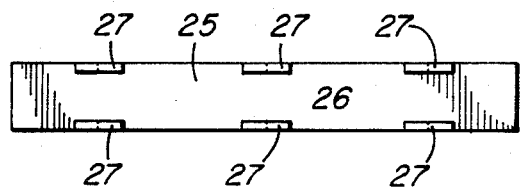
FIGS. 5, 6, 7 and 8 are top plan view, side view, bottom plan view and end view respectively of one form of connecting member.
Figure 6:
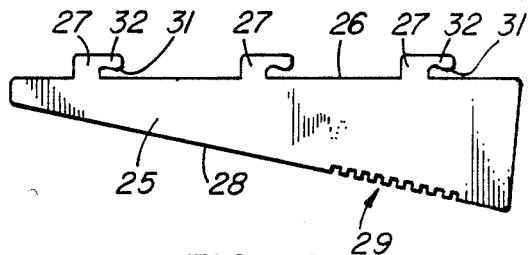
Figure 7:
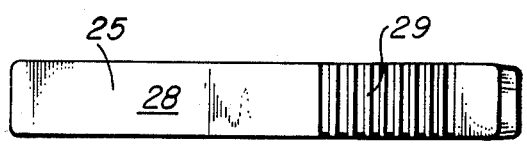
Figure 8:
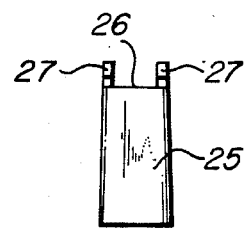

In FIG. 3, a connecting member 25 is shown positioned in the recesses 19. The form of the connecting member, viewed from the side, is wedge-shaped and is dimensioned to be a close fit in the space defined by the contiguous recesses 19. This is seen in FIG. 4, the connecting members being a close fit in the space formed by the two recesses.

FIGS. 5, 6, 7 and 8 are various views of the connecting members. The member has a generally wedge shape, seen in side view, as in FIG. 6. From the top surface 26 of the member extend hook-shaped members 27. The hook-shaped members are in two rows and are positioned on each side of the top surface 26. The bottom surface 28 has a grill portion formed by a plurality of transverse grooves, this being shown at 29. The use of this will be explained later.

To connect two units, the connecting member 25 is first attached to one unit. The hook-shaped members 27 along one side are pushed through slots 30 in the overhanging wall 16 of the unit. The connecting member is then pushed back with the hook-shaped members engaging over the wall 16. The other unit is then held against the first unit and the hook-shaped members along the outer side are pushed through corresponding slots 30 in the corresponding wall 16 of the second unit. The second unit is then pushed forward, relative to the first unit and the hook-shaped members engage over the wall 16 of the second unit.

The hook-shaped members 27 can be given a rounded, convex, form at 31, on the undersurface of the projecting portion 32 of a member. This can be dimensioned so that the distance between the rounded form 31 and the top surface 26 is very slightly less than the thickness of the wall 16, giving a tight friction unit.

To disconnect the units, the connecting member can be moved forward, relative to the units, by pushing on the portion 29. This provides a non-slip area for a digit, for example a thumb, to a user. The units can be connected by a reverse of this, the two units held side-by-side, then the connector member inserted and moved rearwards by sliding, pushing at 29. This is particularly suitable if electrical connection is made between units by cooperative plugs and jacks in the sides of the units.

The attachment is quite rigid and secure and two units can be picked up as an assembly merely by holding one of the units.

It is possible to add a series of units by providing a connecting member for each pair of units. Units can be added and removed very easily.

What is claimed is:

1. An assembly of two communications terminals in side-by-side position, a side wall of one terminal in contact with a side wall of the other terminal; each said side wall having a recess at a lower part, each recess extending inward from the side wall and having an overhanging upper wall; the recesses being contiguous to form a unitary space having a planar top surface, spaced side surfaces and an open bottom; a plurality of slots in each said upper wall, said slots arranged in at least one row in each said upper wall; a connecting member positioned in said space, said connecting member comprising an elongate member having top and bottom surfaces and parallel side surfaces; a plurality of hook-shaped members extending up from said top surface, said hook-shaped members being in rows and extending through said slots; each hook-shaped member having a stem portion extending through a slot and a projecting portion extending substantially normal to said stem portion, the projecting portions all extending in the same direction and extending over and in contact with an upper surface of said upper wall; the side surfaces of the elongate member being in close proximity with said spaced side surfaces of said space, and the top surface of the elongate member being in contact with said planar top surface of said space.

2. An assembly as claimed in claim 1, said recesses in each side wall having a wedge shape viewed in a direction normal to the side wall, said overhanging upper wall being inclined upward and rearward, and said connecting member having a wedge-shaped form viewed in a direction normal to the length of the connecting member to cooperate with the wedge-shaped recesses.

3. An assembly as claimed in claim 2, each terminal having a bottom planar surface, the bottom surfaces being co-planar, and said bottom surface of said elongate member being co-planar with the bottom surfaces of said terminals.

4. An assembly as claimed in claim 3, including a plurality of transverse grooves in said bottom surface of said elongate member.

* * * * *